Figure 4:
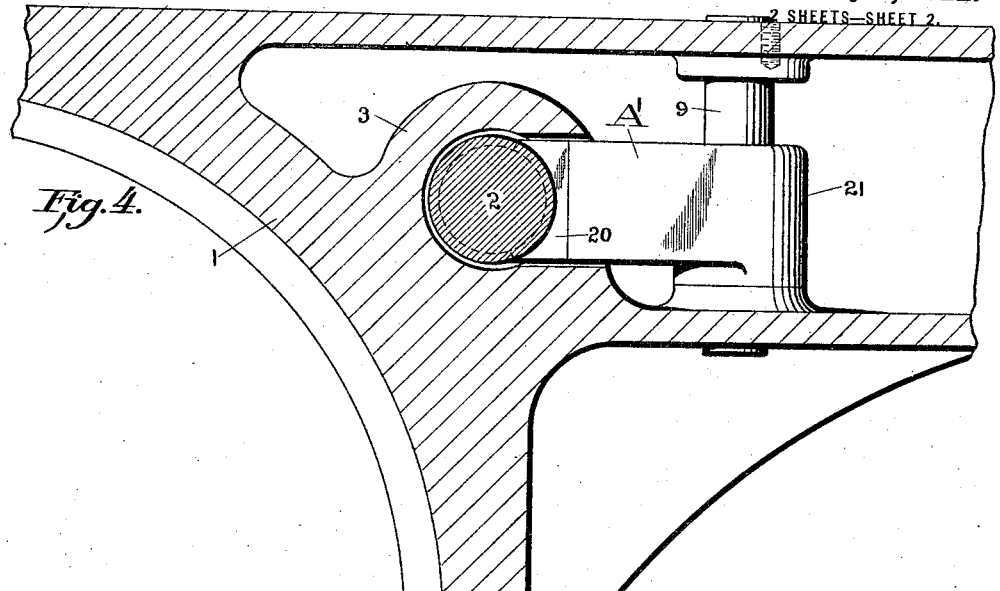

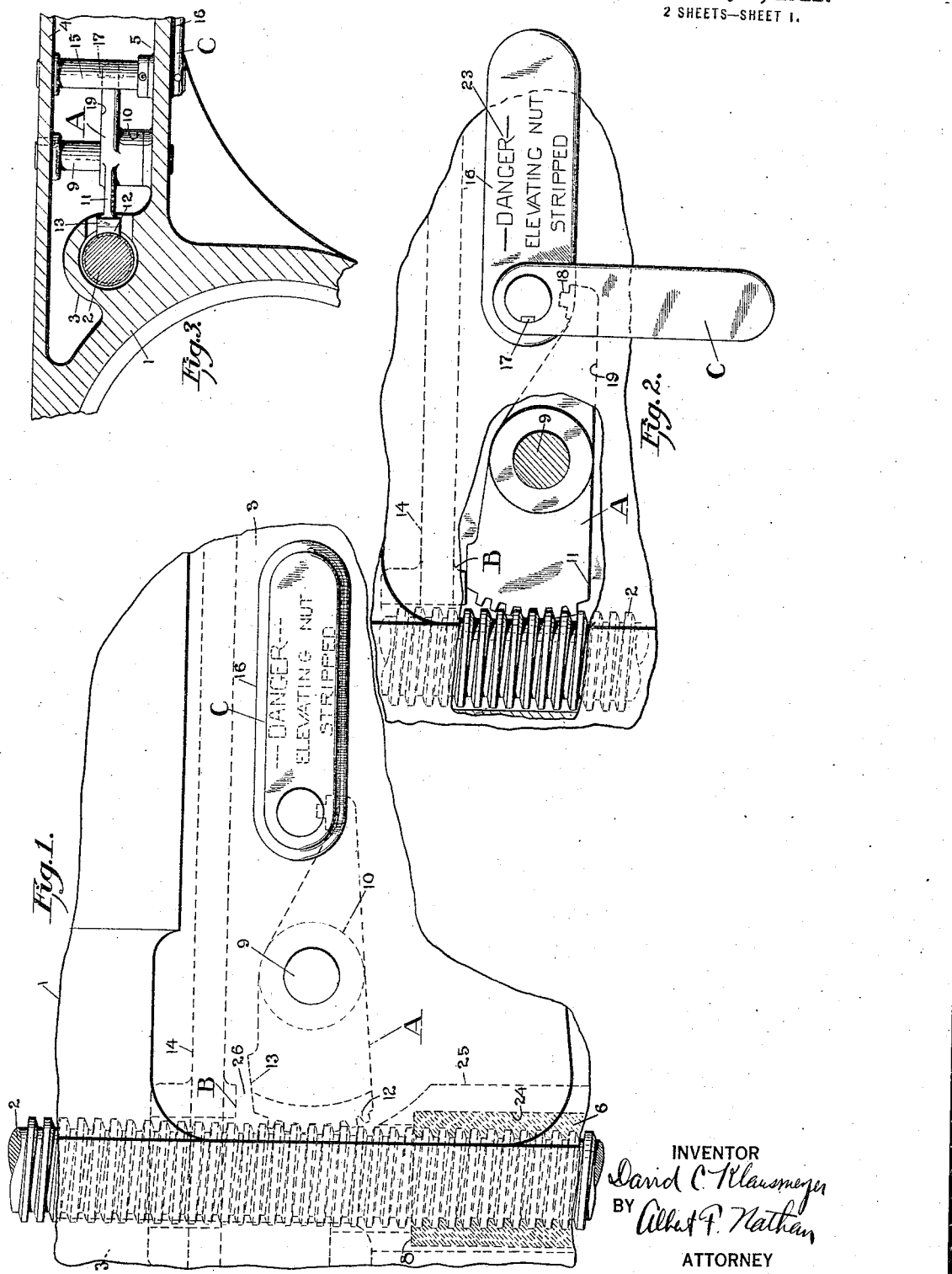

D. C. KLAUSMEYER.
GEAR LIKE INDICATOR OF STRIPPED THREADS.
APPLICATION FILED JULY 23, 1921.

1,415,005.

Patented May 2, 1922.
2 SHEETS—SHEET 2.

INVENTOR
David C. Klausmeyer
BY Albert P. Nathan
ATTORNEY

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

GEAR-LIKE INDICATOR OF STRIPPED THREADS.

1,415,005.  Specification of Letters Patent.  Patented May 2, 1922.

Application filed July 23, 1921. Serial No. 487,067.

*To all whom it may concern:*

Be it known that I, DAVID C. KLAUSMEYER, a citizen of the United States, and residing at Cincinnati, in the county of Hamilton and State of Ohio, have invented a new and Improved Gear-Like Indicator of Stripped Threads, of which the following specification is a full disclosure.

This invention is addressed to the prevention of accidental drops of a member depending for its support on screw threads unduly worn by long usage or lack of lubrication, and it was contrived, in its more specific aspect, to safe-guard the user of a so-called "radial-drill" in which a heavy and complicated head is carried by a horizontally extending arm which, in turn, is elevated by a screw threaded through a nut. The nut is conventionally embedded in the arm and the elevation is effected by causing the screw to rotate; thereby bodily raising both the nut and the arm simultaneously.

This invention is predicated upon the proposition that, when the nut and arm are bodily translated as a unit with respect to the screw, any other element carried by the arm (and at the same time in threaded engagement with the screw), and independently movable on said arm save for its engagement with said screw, will remain in unaltered relation with the nut so long, and only so long, as the normal relation between the nut and the screw is maintained. Should said normal relation be disturbed, however, either by undue wear or by the actual failure of the nut threads, the screw will (independently of its rotations) translate with respect to the arm, to the nut and to said movable element and will, so to speak, operate like a rack on said element and cause it to move relative to the arm on which it is mounted. This invention takes advantage of the aforesaid peculiarity by utilizing the thus-effected movement of said element (1st) to arrest any further abnormal translation between the arm and the nut and (2nd) to give warning to the user of the untoward condition of the parts, either by displaying a signal or sounding an alarm or otherwise; as may be preferred.

In carrying forward this conception, there are certain structural advantages in making use of a pivot, or a mounting involving an arcuate path, for the purpose of supporting the aforesaid element on the arm; in which case the element may have its screw-engaging contour in the nature of a gear, or segment of a gear, having its pitch line concentric or eccentric with the center of rotation of the member, according to the ultimate result desired. Thus, in case no interference with the continued rotations of the screw is desired, the concentric relation will be resorted to in conjunction with some suitable provision for arresting or braking the movement of said element. Should, however, it be desired also to terminate the rotations of the screw as soon as the nut has stripped, this invention may readily be adapted to that end by resorting to the eccentric relation for the purpose of exerting a wedge-like action on the screw and frictionally retarding its rotations; in which case the drive for the screw will embody some conventional safety-slip or safety-yield device, as will be understood.

Figure 5:
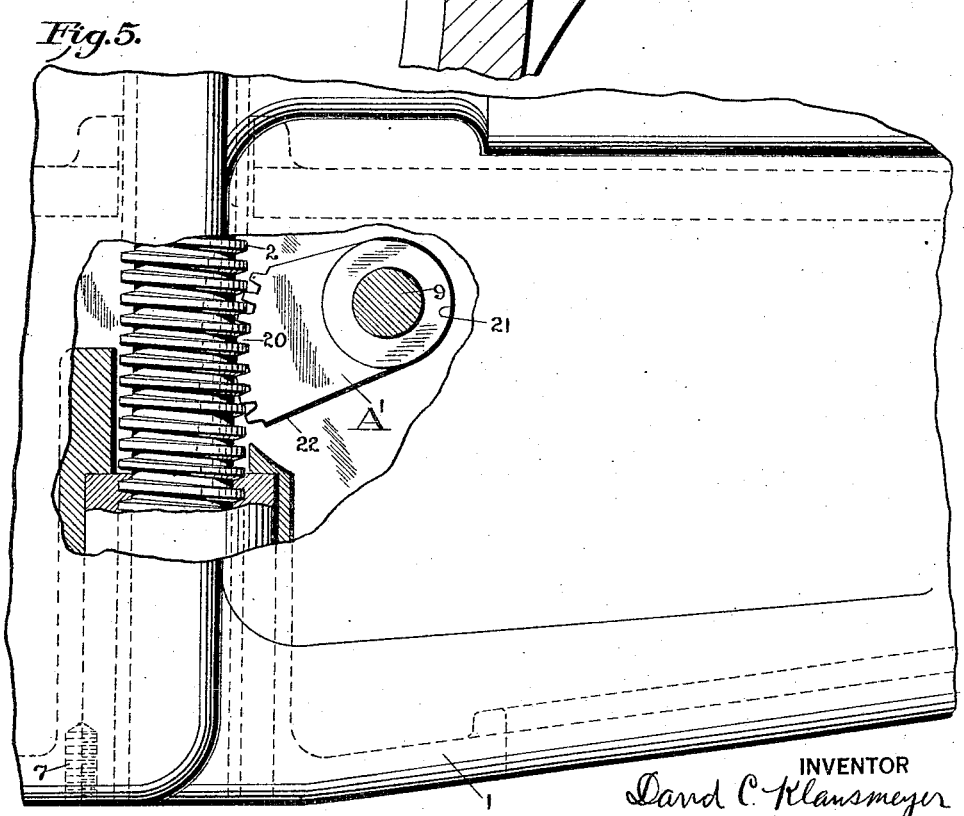

The above-outlined objects of this invention will be better understood by referring to typical concrete examples; two of which are depicted in the accompanying drawings, of which:

Fig. 1 is a side elevation of a portion of the arm of a radial drill embodying this invention; the parts being depicted in their normal relations. Fig. 2 is a similar view but showing the positions assumed by the parts to warn the user that the regular nut needs to be replaced owing to wear or the stripping of its threads. Fig. 3 is a section taken through line 3—3 of Fig. 1 showing further details in the mounting of the parts. Fig. 4 is a sectional plan of a modified application of this conception whereby the revolution of the screw is impeded in case of undue wear. Fig. 5 is an elevation of the parts forming said modification.

The primary objects of this auxiliary are (A) to hold the arm from falling and (B) to inform the user that the conventional nut is no longer fit for service; although the first exemplification is so devised that it may for a brief period serve as a temporary substitute for the unduly-worn regular nut. Depending upon the proportioning and adjustment of the parts, the warning may be given either after the threads have actually stripped or when they have become so far worn as to be unreliable.

Referring to the drawings, 1 indicates the element to be elevated; said element being here instanced as the arm of a radial drill. A rotatable lifting screw 2 extends upwardly, in a conventional manner, and is threaded through an ordinary nut 6 which is secured by means of a screw 7 in a socket 24 provided by a boss 25 interiorly integral with the arm 1. The upper end of the nut rests against a shoulder 8 provided by said boss 25 and is thereby secured against movement.

The element A is gear-like in form and consists of a hub 10 pivotally carried by a stub-shaft 9 appropriately mounted at its ends in the side-walls 4 and 5 of the arm. The element A provides an arm 11 which at its free end terminates in a rim provided with teeth 12; this rim being in the nature of a segment of a worm gear in mesh with the threads of the screw. In the form shown by the Figs. 1 to 3, the teeth are located on a circular arc concentric with the axis of the shaft 9. It will be seen that, so long as the threads on the nut remain unworn, there will be no movement of the element A with respect to the nut; these two parts being bodily movable together as a unit with the arm. Should wear of the nut-threads take place, the screw will shift its position accordingly with respect to the nut and a corresponding movement of the element A will obtain. It will be noted that, inasmuch as the element A exerts no pressure on the threads of the screw (being self-positioning so to speak), there will be no appreciable wear of the threads of the element A and the latter will, therefore, be capable of being moved by this screw in true proportion to the extent of the wear between the screw and the nut. Consequently, the position of the element A will afford a true indication of such wear as may occur in the threads of the nut. This movement will, however, be necessarily comparatively slight and, if unmagnified, might easily escape the notice of the user. This invention, accordingly, proposes the employment of an auxiliary indicator sensitive to comparatively slight movements of the element A. While various arrangements of this nature may readily be provided, such for example as an elongated pointer affixed to the element A, a simple and rugged device well suitable for the requirements of a machine-tool has been indicated on the drawings. This consists of a plate C secured to a rock-shaft 15 pivoted between the walls 4 and 5 of the arm; the plate being arranged adjacent the outer face of the arm and normally covering an appropriate warning legend 23 imprinted on a slightly raised boss 16 provided by the arm. This plate is normally held in the position shown by Fig. 1 by means of a sensitive catch operated by the element A. This catch comprises a trigger 18 normally engaging a notch 17 in the rock-shaft 15. By appropriately proportioning these parts, it will be seen that the plate or indicator C may be automatically released whenever the wear has taken place to a predetermined extent or whenever the threads of the nut have become stripped.

In a very simple manner, the element A may be utilized as a safety device having for its object the prevention of an abrupt descent of the arm due to the stripping of the nut-threads. To this end, a positive stop is arranged to limit the extent of the movement of the element A caused by its engagement with the threads of the screw. This stop may consist of a lug B carried by a portion of the arm, such as the web 14; said lug B being located in the path of a seat 13 provided by the element A. When initially installed, a slight clearance indicated by 26 will be provided between the lug B and the seat 13, so that the element A may "float" with the screw to the extent of unobjectionable wear of the threads of the nut. This clearance 26 will be such that the indicator-plate C will be released before contact is established between the seat 13 and the lug B. It should not, however, be materially greater than the thickness of the thread of the nut, in order to minimize the shock imposed on the threads of the element A in abruptly arresting the fall of the arm occasioned by a failure of the nut. By keeping the clearance thus limited, the threads of the element A will serve as an emergency nut for a limited period of time enabling the user of the machine to continue its use for a short time until the new nut can be obtained and substituted.

In the modification represented by Figs. 4 and 5, the element A′ is not intended to be used as an emergency nut in so far as further elevations of the arm are to be made, but it does act as an emergency nut to the extent of preventing the fall of the arm and locking the lifting screw against further rotations, thereby keeping the machine out of service until a new nut has been substituted for the injured one. In this modification, the element A′ is also pivoted to a shaft 9 fixed to the arm, being provided with a hub 21 for that purpose. The wing 22 of the element A′ has an arcuate peripheral face provided with worm-teeth meshing with the threads of the screw. Unlike the element A in the first described form, the pitch line of these worm-teeth is not concentric with the axis of the shaft 9, but progressively increases its distance therefrom in any suitable ratio, as indicated by Fig. 5. In consequence of this peculiarity, any movement of the screw independently of its threaded relation with the nut, will cause the part A′ to move clock-wise and act as a wedge pressing its teeth forcibly against the threads of the screw and frictionally retarding the rotations of the latter. This modification is preferably used in conjunction with any one of the several expedients conventionally resorted to for the purpose of preventing the screw from being positively driven whenever the arm meets with some undue obstruction. Such devices are in the nature of frictional slip-clutches or in the form of replaceable shear-pins or in the form of intermediate gears arranged to jump out of mesh in the event of excessive duty requirements; the illustration of these being omitted since they are so well known.

It will, from the foregoing, be seen that this invention is well adapted to achieve its objects and will afford adequate safety on the part of users of the machine. It serves effectively to prevent the damage resulting from a failure of the nut and it may be used to give a clear indication of the condition of the nut-threads and may either be used alone or combined with other arrangements serving the latter purpose, if so desired. For example, the alarm may be given by means of a gong or any other suitable signal system.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A machine-tool of the nature disclosed combining a frame element; a nut and screw cooperating to elevate said element; a gear-like member carried by said element and meshing with the threads of said screw and adapted to be moved thereby idependently of said element at the termination of the cooperation between the nut and screw; and means actuated by said member adapted to warn the user of the termination of the cooperation between the nut and the screw.

2. A safety device for elevating mechanisms comprising, in combination, the member to be elevated; a screw and a nut for elevating it; a part pivoted to said member and arranged to mesh with said screw, said part having a restricted rotation about its axis; and a warning device adapted to be actuated by a partial rotation of said part.

3. A safety device for elevating mechanisms comprising, in combination, the member to be elevated; a screw and a nut for elevating it; a part pivoted to said member and arranged to mesh with said screw, said part having a restricted rotation about its axis; and means for exhibiting a warning, said means being self-actuated and normally restrained by said part but releasable upon a movement of said part.

4. A drilling machine combining a radial arm; a nut non-translatably mounted on said arm; an elevating screw passing upwardly through said nut; a gear-like member pivoted to said arm in mesh with the threads of said screw and adapted to be rotated thereby in case said screw should be given a translation independently of its cooperation with said nut; and a signal device adapted to be operated by said member.

5. A safety-device of the nature disclosed combining a member adapted to be elevated; a lifting-screw threaded to said member; an element rotatably carried by said member and also in engagement with the threads of said screw; a stop provided by said member and spaced slightly from the abutment provided by said element; and a signal-giving means connected with said element and adapted to be actuated by a movement of said element insufficient to establish contact between said stop and said abutment.

6. A safety-instrumentality of the nature disclosed combining a member adapted to be elevated; a lifting-screw threaded thereto; an element pivotally mounted on said member and providing teeth engaging said screw; and a self-acting signal device normally held out of action by an engagement with said element but adapted to be released by an angular movement of said element corresponding to a distance less than the thickness of a thread on said screw.

7. A drilling-machine combining a radial arm; a lifting-screw threaded therethrough; an indicator mounted on said arm; and means intervening between said screw and said indicator for enabling the latter to be actuated in case said arm has shifted along said screw a distance appreciably greater than that corresponding to the normal revolutions of said screw.

In witness whereof, I hereunto subscribe my name, as attested by the two subscribing witnesses.

DAVID C. KLAUSMEYER.

Witnesses:
C. C. SLETE,
L. G. KECK.